May 29, 1956  A. A. NOWICKI ET AL  2,747,542
RIBBON AND ROLL INKER FOR CASH REGISTERS AND THE LIKE MACHINES
Filed Nov. 6, 1953  6 Sheets-Sheet 1
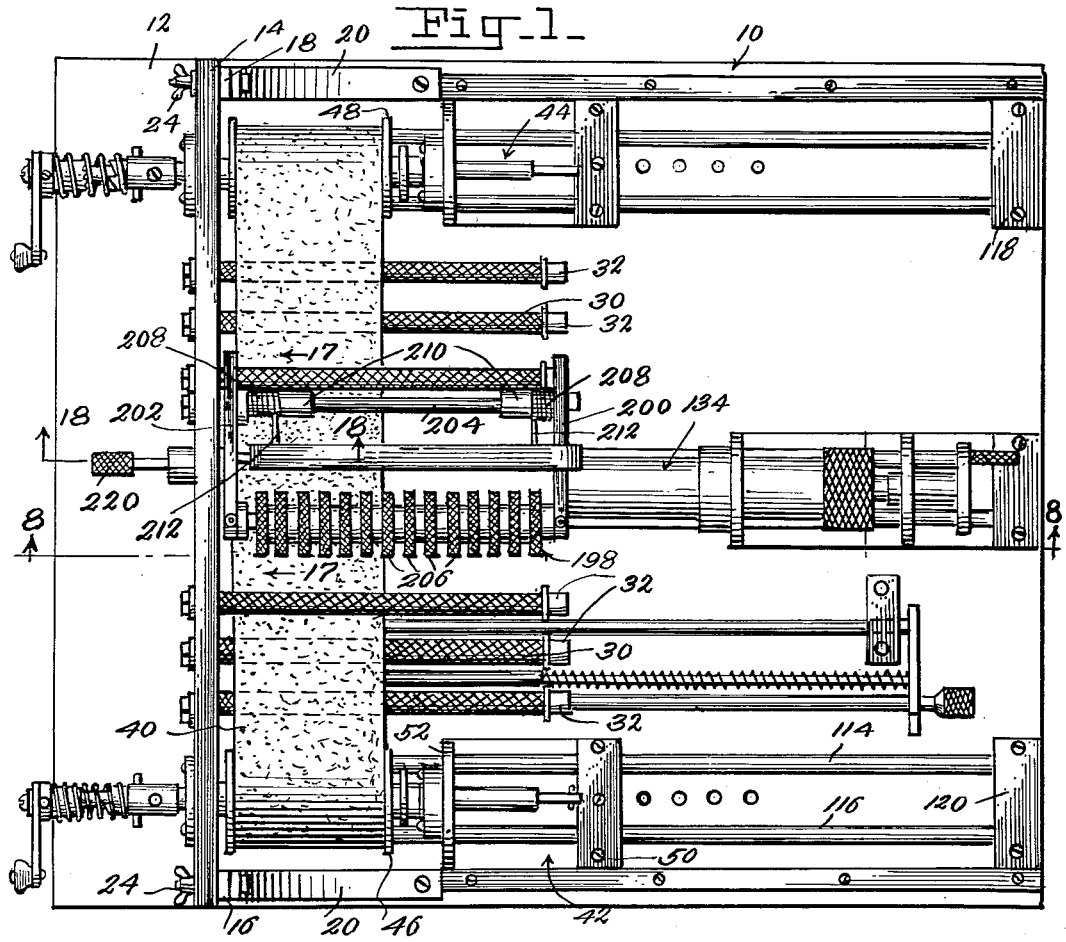
INVENTORS
ALOYSIUS A. NOWICKI
BY JOHN N. GORDON
Patrick D. Beavers
ATTORNEY May 29, 1956 A. A. NOWICKI ET AL 2,747,542
RIBBON AND ROLL INKER FOR CASH REGISTERS AND THE LIKE MACHINES
Filed Nov. 6, 1953 6 Sheets-Sheet 2
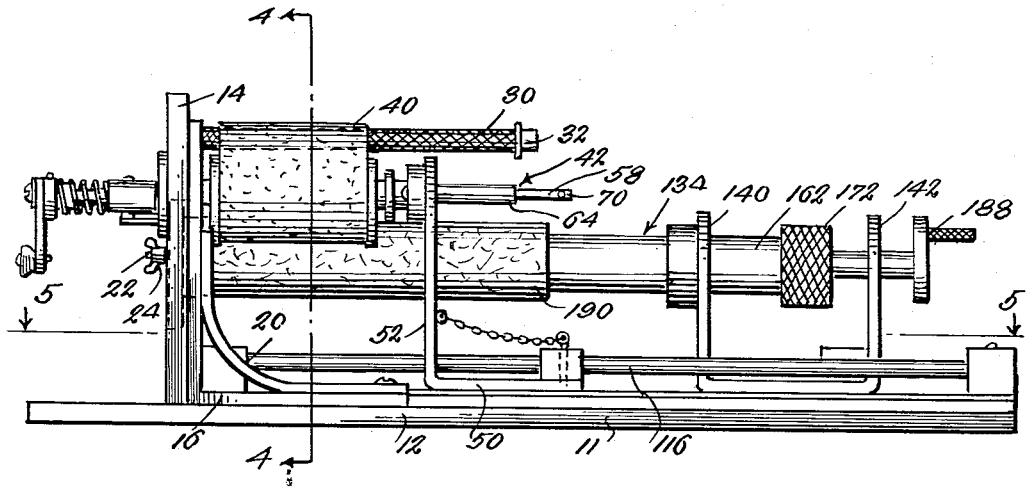
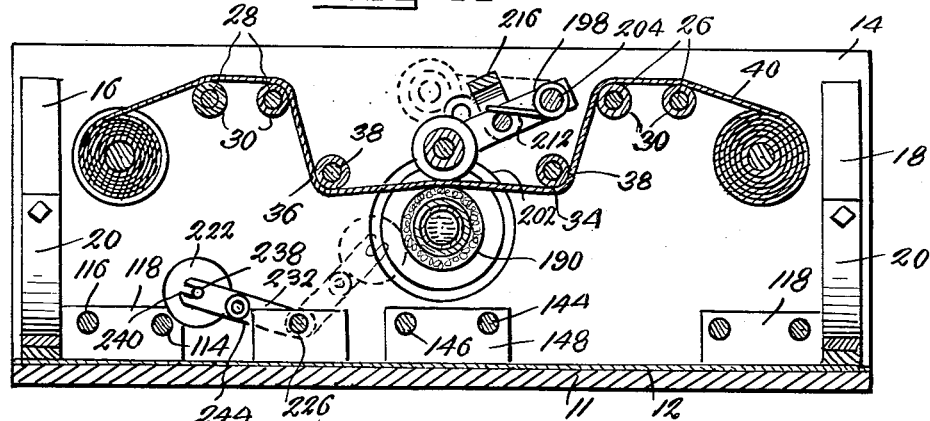
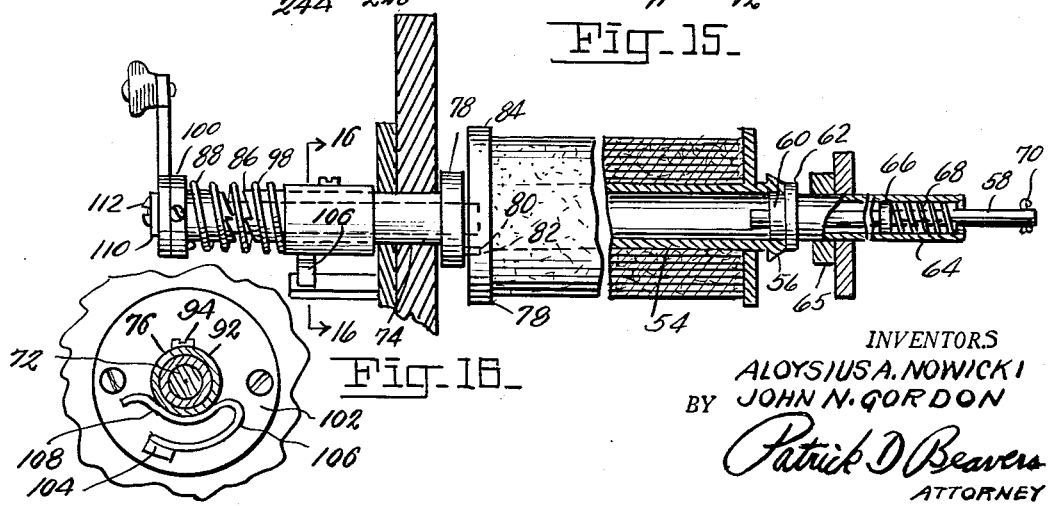
INVENTORS
ALOYSIUS A. NOWICKI
JOHN N. GORDON
BY
Patrick D Beavers
ATTORNEY

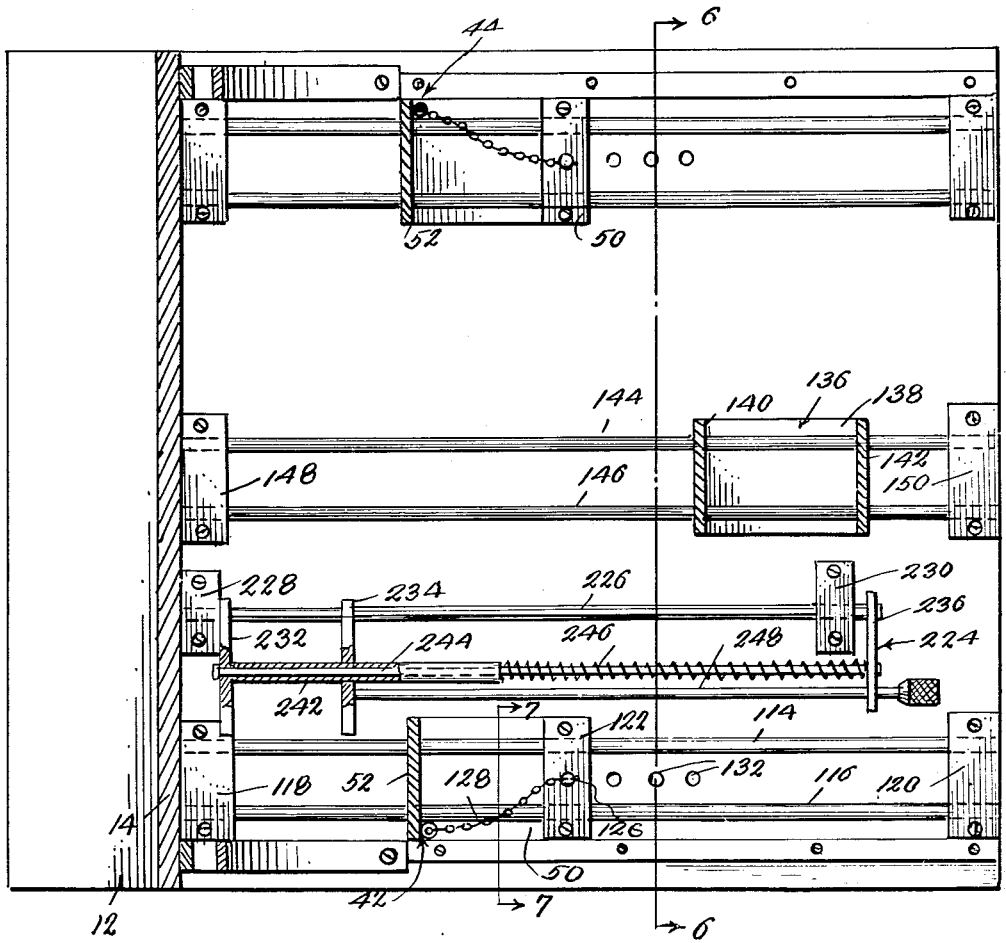
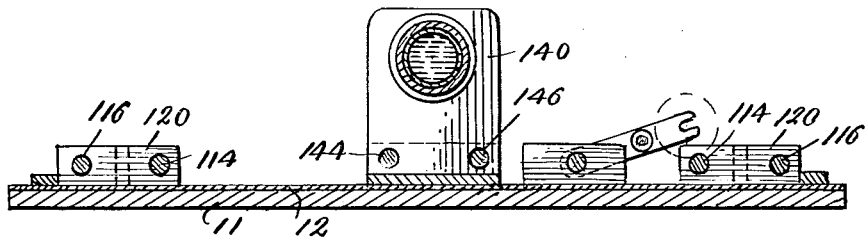
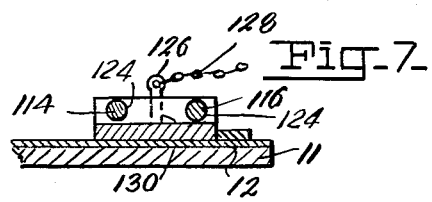

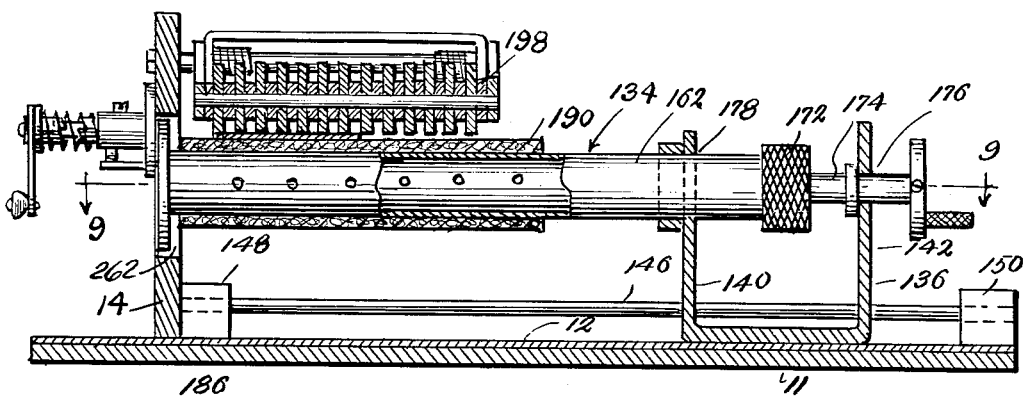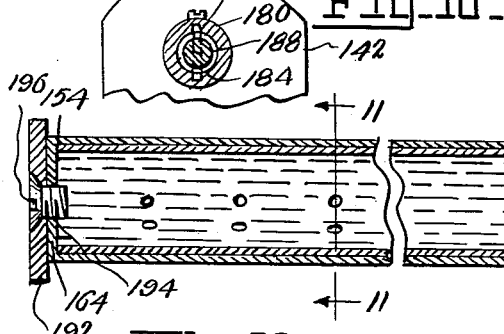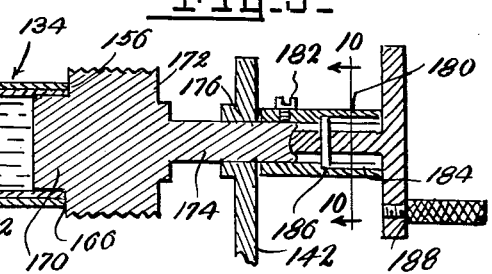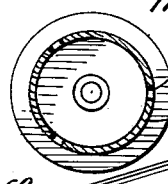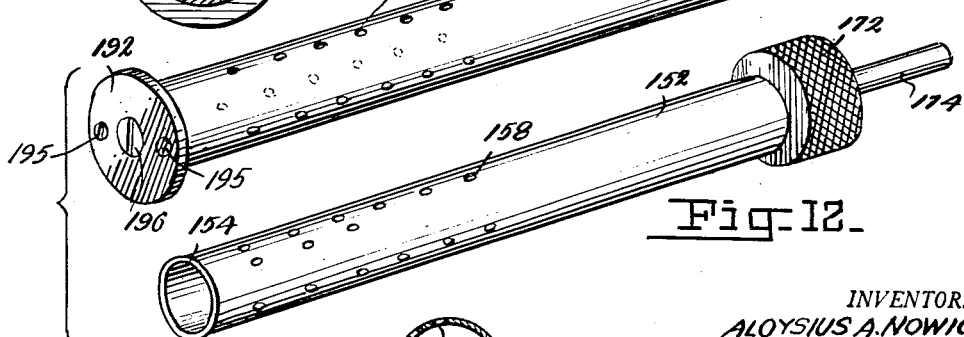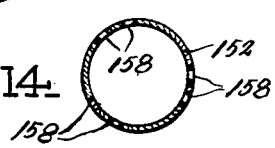

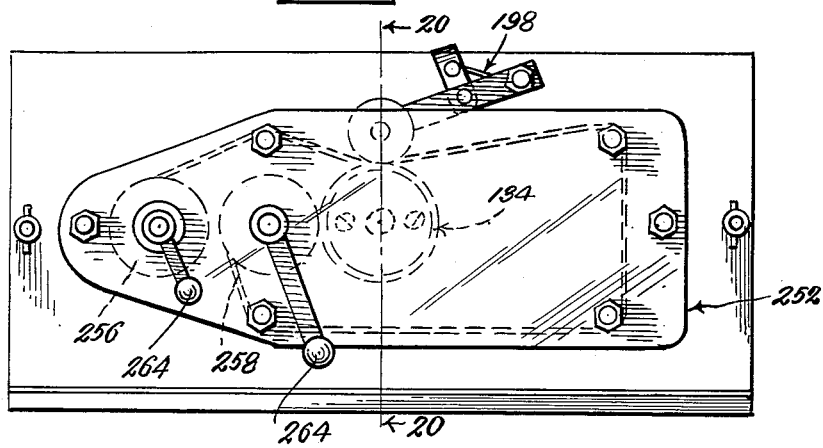
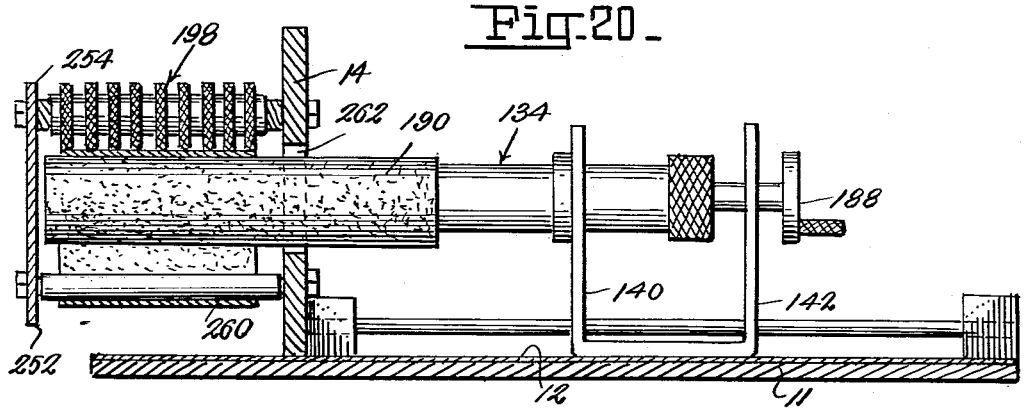
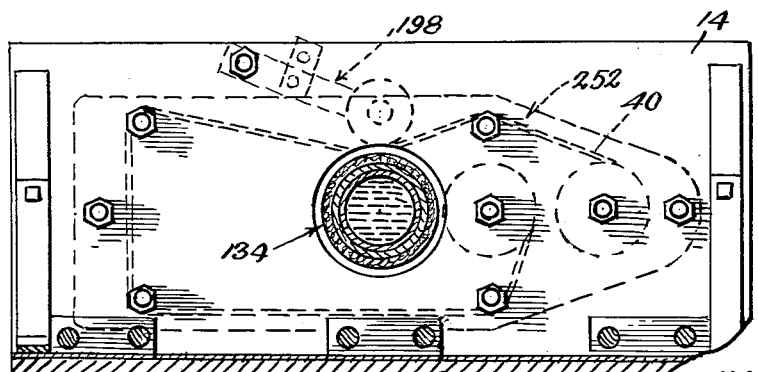

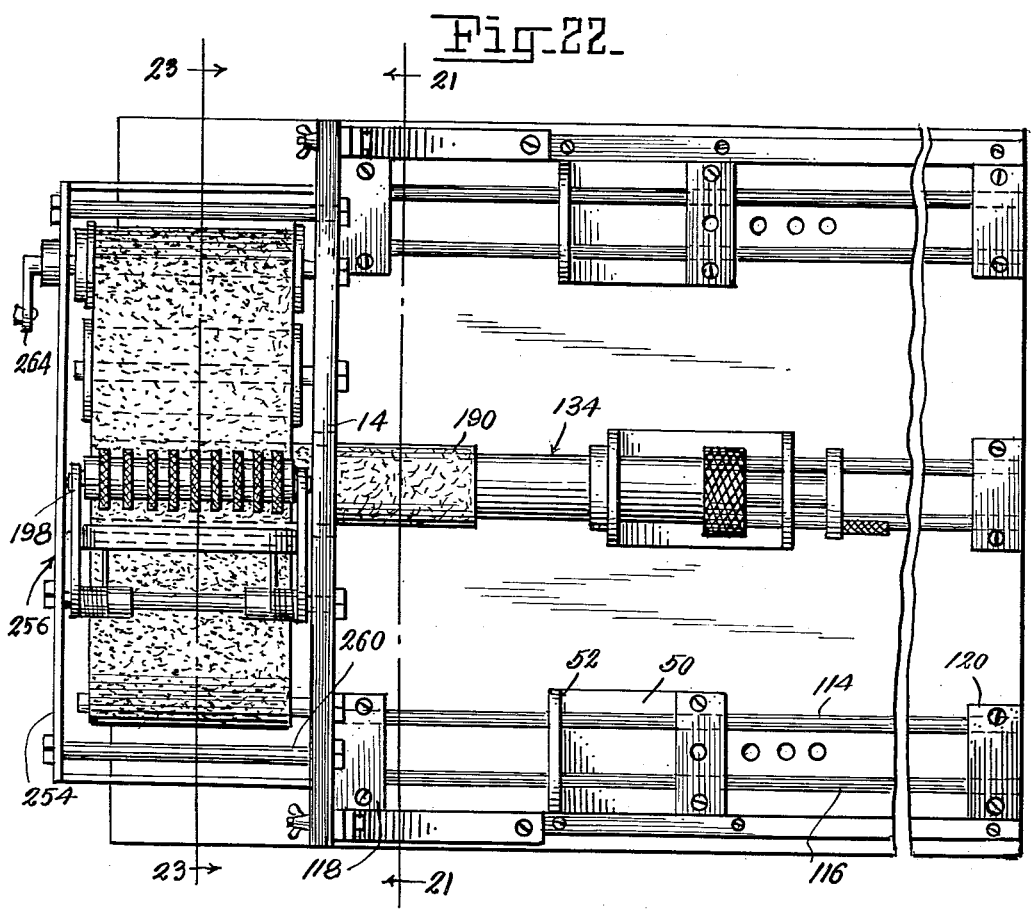
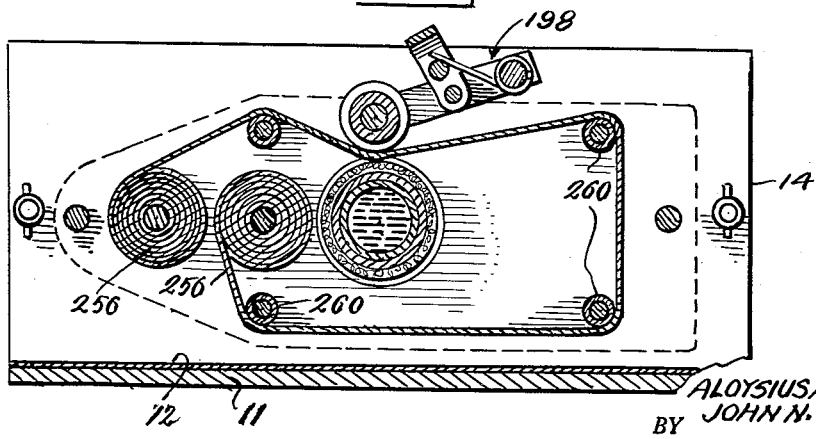

United States Patent Office 2,747,542
Patented May 29, 1956

2,747,542

RIBBON AND ROLL INKER FOR CASH REGISTERS AND LIKE MACHINES

Aloysius A. Nowicki and John N. Gordon, Milwaukee, Wis.

Application November 6, 1953, Serial No. 390,637

5 Claims. (Cl. 118—235)

This invention relates to improvements in inking machines for ribbons and especially relates to a machine for inking cash register ribbons and felt rolls which are both standard equipment on conventional cash registers.

The primary object of this invention is to provide a machine for evenly and quickly inking cash register and the like business machine ribbons, the ribbons having a complete and correct amount of ink evenly applied to their entire surface as they are quickly wound over an inking roller.

A further object of this invention is to provide a ribbon inking machine which will rotatably support the ribbon spools, regardless of size, of cash registers in a manner so that the ribbon is wound from one spool onto the other and in so doing is passed over an inking roller, where ink is evenly and completely distributed over the entire surface thereof.

A further object of this invention is to provide an adjustable pressure member which engages the ribbon, under adjustable tension, and holds it in contact with the inking roller.

A still further object of this invention is to provide a novel inking roller, which is adjustable to control the flow of ink therefrom and which has an absorbent outer surface into which the ink flows to saturate the same, thus avoiding drips, uneven inking and the like defects.

A still further object of this invention is to provide means for supporting a felt roll of a cash register in proximity to the inking roller and for moving the same into peripheral contact with the outer surface of the inking roller.

A still further object of this invention is to provide rotatable mounting means for the inking roller so that it idly rotates as the ribbon is passed thereover and so that it can be rotated by a rotating means when in contact with the felt roll.

These and ancillary objects are attained by this invention, the preferred embodiment of which is set forth in the following description and illustrated in the accompanying drawings, wherein;

Figure 1 is a top plan view of the inking machine, constructed in accordance with this invention;

Figure 2 is a side elevational view thereof, showing the cranks for rotating the ribbon spools;

Figure 3 is an end elevational view;

Figure 4 is a vertical longitudinal sectional view taken on line 4—4 of Figure 3;

Figure 5 is a horizontal sectional view taken on line 5—5 of Figure 3;

Figure 6 is a longitudinal vertical sectional view taken on line 6—6 of Figure 5;

Figure 7 is a detailed vertical sectional view taken on line 7—7 of Figure 5 and showing the means for locking the ribbon spool mount in adjusted positions, such being adjustable to accommodate spools of varying lengths;

Figure 8 is a vertical cross-sectional view taken on line 8—8 of Figure 1;

Figure 9 is a sectional view taken axially through the ink roller on the line 9—9 of Figure 8;

Figure 10 is a fragmentary cross-sectional view of one end of the roller, taken on line 10—10 of Figure 9;

Figure 11 is a cross-sectional view of the roller, taken on line 11—11 of Figure 9;

Figure 12 is a perspective view of the inner and outer relatively rotatable cylinders which compose the adjustable portion of the roller;

Figure 13 is a cross-sectional view of the outer cylinder, showing the circumferential spacing of the outlets therein;

Figure 14 is a cross-sectional view of the inner cylinder, showing the circumferential spacing of the outlets therein;

Figure 15 is an enlarged side elevational view, partly in section, of one of the ribbon spools and its mounting and rotating means;

Figure 16 is a cross-sectional view showing the braking and locking means to hold the spool against rotation and is taken on line 16—16 of Figure 15;

Figure 17 is a detailed vertical sectional view taken on line 17—17 of Figure 1;

Figure 18 is a cross-sectional view taken on line 18—18 of Figure 1;

Figure 19 is a side elevational view of a modified form of this invention;

Figure 20 is a vertical cross-sectional view thereof, taken on line 20—20 of Figure 19;

Figure 21 is a longitudinal vertical view taken on line 21—21 of Figure 22;

Figure 22 is a top plan view thereof, and

Figure 23 is a longitudinal vertical sectional view taken on line 23—23 of Figure 22.

Conventionally, the ribbons of business machines, such as cash registers, accounting machines and the like, are inked in a manner requiring an expenditure of from twenty to thirty minutes and involving the unwinding of a ribbon on a flat surface, the manual daubing of ink on the ribbon and the removal of excess ink at points and the reapplying of ink at other spots. Such an operation is slow and messy.

Such inking of ribbons is necessary since the ribbons in use quickly exhaust the ink thereon, so that the printed legends or numbers become illegible and the ribbon is subjected to excessive wear in such a dry state. However, it is desirable that the ink be applied smoothly and evenly in a complete manner so that each portion of the ribbon prints in a clear and legible fashion without smudges.

The inking machine 10 is designed for this purpose and accomplishes this result in a quick manner without overinking or underinking. The machine, as shown generally and in detail in Figures 1-18 includes a base 11, which has an upper surface or plate 12, from adjacent one side edge thereof a vertical supporting plate 14 upstands. The plate 14 has its inner surface abutting the vertical flanges of angle brackets 16 and 18 which have their horizontal flanges seated on and suitably secured to the upper surface of the base plate at the ends thereof. The angle brackets are reinforced by bowed strips 20 which are anchored to the fastening means for the horizontal flanges and are attached to the bolts 22, which pass through suitable apertures in the vertical flanges and the plate 14. The bolts receive wing nuts 24. In this manner the supporting plate 14 is removably attached perpendicularly to the base plate 12 and can be easily removed for other operations, as shown in Figures 19-23 and will be described.

The supporting plate 14 is provided with a first pair of side by side, laterally projecting studs 26, which extend inwardly from the plate just below the upper edge thereof and midway between the center and one end thereof, as shown in Figure 4. A second pair of side by side, laterally extending studs 28 are provided and extend inwardly at a point substantially midway between the other end of the plate and the center thereof. The pairs of studs are in the same horizontal plane and are fixedly secured. The studs receive sleeves or rollers 30 which are rotatably circumposed thereon and are located against axial movement by the plate 14 and the heads 32 on the extending ends of the studs.

Below the pairs of studs and lying on opposite sides of the center of the plate 14, studs 34 and 36 are provided. The studs 34 and 36 project laterally from the plate, inwardly thereof and lie in the same horizontal plane. The studs 34 and 36 are positioned below and inwardly of the innermost studs of the pairs 26 and 28 and have rollers or sleeves 38 rotatably circumposed thereon. All of the studs are parallel and their rollers provide guides for the ribbon 40 to travel on. In this respect, the rollers are long enough to accomodate ribbons of very wide widths, the length of the rollers being ascertainable, for example, from Figure 3. It will be noted that each of the rollers has a knurled periphery on which the ribbon moves in intimate contact therewith, the purpose of such surface being to prevent the ribbon from creasing or folding over on its edges and to also stretch the ribbon transversely of its path of movement.

At each end of the plate 14, holders 42 and 44 for the ribbons spools 46 and 48 are provided. Each holder and its associated assemblage is identically constructed so that only a detailed description of the holder 42 will be given. However, it is to be understood that both spools 46 and 48 are mounted in the identically constructed holders 42 and 44 for forced rotation that is, one can be rotated while the other idles, as the ribbon unwinds therefrom onto the one being rotated. Thus, each holder can be rotated, so that one is for the right hand spool and the other for the left hand spool, which spools can only be wound in one direction. Therefore, it doesn't make any difference whether the ribbon, as it and the spools are taken from a cash register or similar business machine, is wound on the left or right hand spools, since the holders for the spools can both be rotated. If the ribbon is wound up on the right hand spool, when taken from the cash register and placed in the inking machine, the left hand spool will be rotated through its holder and, similarly, if the ribbon is wound on the left hand spool, then the right hand spool will be rotated to wind the ribbon thereon in the course of inking it.

The holder 42, as shown in Figures 1, 3, 5, 7, 15 and 16, includes a slide plate 50 which has a vertical wall 52 that parallels the plate 14 and is cooperatively associated therewith to rotatably support the spool 46, as shown in Figure 15. In this respect, the spool has its cylindrical hub 54 projecting at one end 56, the projecting end, which is formed with external lugs to fit it in the rotating mechanism of the cash register, being rotatably circumposed on the end of a spindle 58. The spindle 58 has an annular shoulder 60 which receives the hub end 56 and also has a stop 62 to limit the axial movement of the spindle in the supporting tube 64. The supporting tube 64 is fixed in the wall 52 by means of an annular flange 65, which is secured to the outside of the wall 52, and the tube extends therethrough, its outer end being engaged by the stop 62. The spindle 58 is axially disposed through the tube and apertures in the ends of the tube 64 and has an abutment 66 formed on its portion within the tube. A spring 68 is coiled on the spindle and is housed within the tube, the spring bearing against the abutment and the inner end of the tube. The spring serves to urge the shoulder outwardly from the tube to engage the hub end 56 of the hub 54, while the stop 62, which radially overhangs the shoulder abuts the end of the tube to prevent the shoulder from entering the tube. The stop also locates the hub end 56 on the shoulder. A cotter pin 70 is fixed on the other end of the spindle to prevent such end of the spindle from being pulled into the tube. The pin 70 also enables the spindle to be easily grasped to pull it axially toward the tube, as the spool 46 is being inserted in place. The spring biased spindle 58 then functions as an axially movable support for one end of the spool.

The other end of the spool hub is rotatably journaled on the projecting end of a spindle 72, which extends through an opening 74 in the wall 14. Means for manually rotating such spindle is provided and includes a sleeve 76 which is circumposed on the spindle and extends through the opening 74 in radially spaced relation to the spindle. A collar 78 is formed on the inner end of the sleeve and carries a pin 80 which projects laterally from the inner surface thereof and is seated in a socket 82 formed in the end 84 of the spool, such end 84 and its socket 82 being conventional.

The sleeve 76 is split and the split ends have engaging teeth to provide a clutch 86. The outer portion 88 of the sleeve has a handle 90 fixed thereon. A small brake drum 92 is fixedly circumposed by a set screw 94 on the outer end of the inner portion of the sleeve and a spring 98 is coiled on the split clutch ends of the sleeve and serves to normally keep the inner and outer portions of the sleeves apart and the clutch disengaged. The spring bears against the collar 100 mounting the handle and the drum 92.

A small block 10 is fixed on the wall 14 about the inner portion of the sleeve 76 and has a finger 104 projecting laterally therefrom and extending outwardly from the wall 14. The finger parallels the drum 92 and lies underneath the drum. The finger carries a leaf spring 106 which is bent into a substantially U-shape and has a free end 108 which is curved to conform to the curvature of a portion of the periphery of the drum which it frictionally engages. The spring bears at its free end against the drum to hold the sleeve against rotation but the tension of the spring is overcome, either by engaging the clutch and rotating the handle or pulling the ribbon as when the other spool would be driving and the spool 46 would merely idle, with the clutch disengaged and the ribbon being unwound from such spool. The spring and drum provide a friction brake, which serves two purposes, dependant upon whether the spool is being rotated by its holder or is merely rotating under the pull of the ribbon imposed by the other spool. Such purposes are namely, to prevent the ribbon as it is being wound on the spool, from unwinding from the spool when the handle 90 is released and to keep the ribbon taut as it is being unwound from the spool.

As can be seen, the mounting collar 100 for the handle is fixedly circumposed on the outer portion of the sleeve 76, which portion is axially slidable on the spindle and is normally urged away from the inner portion by the spring 98. The outer sleeve portion and the collar 100 are prevented from being moved off of the spindle by the washer 110 which is held at the outer end of the spindle by the screw 112 which is threaded axially into the outer end of the spindle.

Thus, the spool 46 is normally free to rotate, under the pull of the ribbon, on the spindles 58 and 72. The spool is inserted in place by pulling on the spindle 58 against the opposition of the spring 68 so that the spool can be moved downwardly and positioned between the spindles. The hub of the spool is seated on the spindle 72 and then the spindle 58 is released, with the shoulder 60 lined up with the hub end 56 and seating in such end. The spring 68 keeps the spindle 58 in engagement of the hub and thus, holds the spool on the spindle.

To rotate the spool, the handle 90 is grasped and, by means of it the outer portion of the sleeve is pushed inwardly to engage the clutch, so that the inner portion of the sleeve is driven by the handle and, through the pin 80, rotates the spool.

As can be seen best in Figure 4, the ribbon 40 is guided over the rollers 30 on the pairs of studs 26 and 28 and under the rollers 38 on the studs 34 and 36. The ribbon is stretched taut and held against sagging and folding by the knurled peripheries of the rollers and positioning thereof and by the brake means on each holder 42 and 44.

As shown particularly in Figures 3, 5 and 7, the plate 50 is mounted for axial movement laterally of the wall 14 and relative thereto so that the spindle 58 and its mounting means can be moved bodily relative to the spindle 72 for the purpose of accommodating rollers of various lengths.

For the purpose, a pair of parallel rods 114 and 116 are provided and have their ends anchored in blocks 118 and 120 screwed onto the upper surface of the base plate 12 adjacent the plate 14 and the other side edge of the base plate 12, as shown in Figure 5. The plate 50 has a block 122 fixed on its upper surface and the block is provided with side by side openings 124 which receive the rods. The vertical wall 52 is apertured to also receive the rods.

Locking means is provided to lock the plate 50 in adjusted positions and includes a locking pin 126 which is tethered by a chain 128 to the wall 52. A vertical opening 130 is formed through the block and plate 50 and is registerable with openings 132 formed in the base plate 12 to receive the pin 126, as shown in Figure 7.

The ribbon in its space between the studs 34 and 36 passes over an inking fountain 134, shown in Figures 9–14. A mounting means 136 for the inking fountain is provided, as shown in Figures 5 and 8, and includes a U-shaped slide member 138.

The slide member 138 has its legs 140 and 142 upstanding from the base plate 12 and apertured to receive the parallel rods 144 and 146. The rods are mounted at their ends in blocks 148 and 150, which are fixed on the base plate 12. The slide member 138 is thus movable on the rods, which also keep the legs in perpendicular positions, relative to the plate 14. The legs 140 and 142 support the inking fountain 134 which is rotatably held thereby.

The inking fountain 134 includes an inner tube or cylindrical member 152, which has open inner and outer ends 154 and 156 and which is formed with circumferentially spaced, longitudinally extending rows of radial openings 158. As shown in Figures 12 and 14, there are six rows, the rows being preferably disposed in three pairs with each pair being circumferentially close together.

The tube 152 fits within an outer tube or sleeve 162, which has a closed end 164 and an open end 166. The sleeve 162 is formed with circumferentially spaced, longitudinally extending rows of openings 168 each row being angularly spaced apart from each other.

With regard to the rows of openings in both the tube 152 and the sleeve 162, it is to be noted that such are only provided adjacent the outer ends thereof, that is, from the centers to the outer ends.

The outer end 156 of the tube 152 receives a plug 170 which has a knurled shoulder 172 to enable it to be easily inserted and removed. A coaxially reduced spindle 174 is formed on the plug and is journaled for rotation in the reinforced opening 176 in the leg 142. The portion of the sleeve 162 is rotatably received by the reinforced opening 178 in the leg 140, as shown in Figure 8.

As shown in Figures 9 and 10, the spindle 174 has a sleeve 180 fixed thereon by a set screw 182. The sleeve 180 extends beyond the spindle 174 and has an internal keyway 184 formed therein to receive a key 186 which is carried by a crank 188. The tube and sleeve 152 and 162, which are tightly engaged, are rotated by the crank 188, which can be easily inserted and removed from the sleeve 180.

The tube and sleeve 152 and 162, while in tight engagement, can be relatively rotated by holding the sleeve 162 and turning the shoulder 172, which has its plug in tight nonrotative engagement of the tube 152. The relative rotational movement of the tube and sleeve controls the registry of the openings in each from a closed, out of registry position, to a half-open and fully open, complete registry position. Such positions control the flow of ink from the tube through to the exterior of the sleeve.

In this respect, as shown in Figures 1 and 8, a sleeve 190 is circumposed on the sleeve 162 and is formed from suitable absorbent material to provide an absorbent roller surface for the inking fountain and the sleeve 190 evenly absorbs the ink so that it is completely and evenly saturated.

To fill the fountain, a cap 192 is provided and is secured over the filling opening 194 in the closed outer end 164 of the sleeve 162 by screws 195 and carries a screw cap 196 which is threaded in the center opening 194 thereof.

The outer end of the fountain having the cap 192 thereon is movable through an opening 262 in the plate 14, as shown in Figure 8, with the entire unit sliding axially in the legs 140 and 142 and with the slide member 138 sliding on the rods 144 and 146. Thus, the sleeve 190 can be positioned exteriorly of the plate 14 (as shown in Figures 19–23). To accommodate this movement and still impart rotation to the inking fountain, the crank 188 has the sliding key 186.

As the ribbon passes over the inking fountain, it is held in intimate frictional contact with the sleeve 190 by a hold-down or pressure member 198, the contact being sufficient to cause the sleeve 190 and tube 152 and sleeve 162 to rotate as a unit, thereby presenting different peripheral portions of the sleeve 190 to the ribbon.

The hold-down or pressure member 198 includes a pair of arms 200 and 202 which are journaled on a rod 204 that projects laterally from the plate 14. The arms rotatably support a series of integrally associated, spaced apart wheels 206, which have knurled peripheries and are on a common shaft rotatably journaled in the ends of the arms.

Springs 208 are coiled on the rod 204 and held in place by collars 210. The springs 208 have free ends 212 which bear on a rod 214 that extends transversely between the arms 200 and 202 adjacent their outer ends. The springs exert a tension on the rod 214 to move the arms down about the rod 204 and hold the wheels 206 on the ribbon. A U-shaped member 216 is mounted at its legs on the rod 214 and one leg 218 is engaged by a spring urged plunger 220 carried by the plate 14, as shown in Figure 18. The plunger 220 is provided to hold the pressure member 198 in an upward position above the ribbon.

The wheels, as the ribbon passes over the ink fountain, bear on the ribbon to force ink from the sleeve 190 through the ribbon in a proper even amount.

The amount of ink applied to the ribbon is visible as the ribbon passes over the ink fountain and the amount of ink can be controlled by adjusting the springs 208. The adjustment of the springs controls the tension on the pressure member which in contact with the ribbon presses the ribbon on the sleeve 190 and the entire ink fountain assemblage rotates.

The main purpose for providing the crank 188 to directly rotate the ink fountain assemblage is to ink the convential felt roll 222 of cash registers and similar machines. As shown in Figures 4–6, the roll is supported by a pivotal supporting means 224, which includes a rod 226 that is mounted in base blocks 228 and 230. Arms 232, 234 and 236 are radially carried by the rod and are rotatably mounted thereon. The arms 232 and 234 have fork free ends 238 to support the shaft 240 (Figure 4) of the felt roll. The arm 234 is connected to a sleeve 242 within which a rod 244 is disposed. The sleeve is integral with the arm 234 and extends laterally from opposite sides thereof. The rod is attached to the arm 232 and the arm 236 and a spring 246 is coiled on the rod between the sleeve 242 and the arm 236. The spring serves to hold the axially slidable sleeve 242 and slidable arm 234 against the fixed arm 232. The purpose of having the arm 234 adjustable and under spring tension is to enable the arms 232 and 234 to support holders of varying lengths. A rod 248 is connected to the arms 234 and 236, adjacent their outer ends and terminates in a knurled knob 250 beyond the arm 236. The knob is grasped to swing the arms about the rod 226 and, thereby, bring the felt roll into peripheral contact with the sleeve 190 and, under such contact, the roll is rotated as the ink fountain assemblage rotates, either under the ribbon movement or by the crank 188.

In Figures 19–23, a modified form is shown wherein the ribbon assembly 252 is removed in toto from the cash register and includes the supporting plate 254, which is mounted to and parallel with the outside of the plate 14. The plate 254 carries the spools 256 and 258 in the cash register, so that the plate 254, when removed from the cash register, still supports the spools. The plate 254 is bolted in spaced relation to the plate 14 and the spools and rollers project laterally therefrom. The rollers 260 are attached by studs in the manner of the rollers 30 but extend outwardly from plate 14. The pressure member 198 is reversed from its position in Figure 1 and is attached to the plate 14 on the outside thereof. The ink fountain unit is moved axially through an opening 262 in the plate 14 to a position where the sleeve 190 underlies the wheels of the pressure member, as shown in Figures 22 and 23. The spool crank 264 is then used to rotate either one of the spools with the ribbon being threaded around the guide rollers as shown in Figure 23. The other features and the operation are the same as described and explained in connection with Figures 1–18.

Thus, it can be seen that we have provided a compact and sturdy machine which can be dependably used to ink ribbons for business machines in a fast and efficient manner without over inking or under inking.

While the best known form or forms of this invention has been disclosed herein, it is to be understood that other forms may be realized as come within the scope of the invention defined by the appended claims.

What is claimed:

1. A ribbon inking machine comprising an inking roller having an inner ink supply, an absorbent sleeve circumposed on the roller, means controlling the flow of ink from the roller to the sleeve, means mounting a pair of ribbons spools, means associated with such mounting means for selectively rotating the spools, guide means for the ribbon for guiding it between the spools and in contact with the sleeve and a spring urged notched roller engaging the ribbon and pressing it into engagement with the sleeve with the inking roller rotating under such engagement as the ribbon moves past thereagainst, said spool mounting means including a slide member, a spindle carried by the slide member, means locking the slide member in adjusted position and spring means for said spindle which is retractable against the urgement of the spring means and an axially located spindle in spaced complementary relation to said first spindle, the spindles journaling a spool.

2. A ribbon inking machine comprising an inking roller having an inner ink supply, an absorbent sleeve circumposed on the roller, means controlling the flow of ink from the roller to the sleeve, means mounting a pair of ribbon spools, means associated with such mounting means for selectively rotating the spools, guide means for the ribbon for guiding it between the spools and in contact with the sleeve and a spring urged notched roller engaging the ribbon and pressing it into engagement with the sleeve with the inking roller rotating under such engagement as the ribbon moves past thereagainst, said spool mounting means including a slide member, a spindle carried by the slide member, means locking the slide member in adjusted position and spring means for said spindle which is retractable against the urgement of the spring means and an axially located spindle in spaced complementary relation to said first spindle, the spindles journaling a spool, and means associated with the last spindle for rotating the spool, such means including a normally disengaged clutch means.

3. A ribbon inking machine comprising an inking roller having an inner ink supply, an absorbent sleeve circumposed on the roller, means controlling the flow of ink from the roller to the sleeve, means mounting a pair of ribbon spools, means associated with such mounting means for selectively rotating the spools, guide means for the ribbon for guiding it between the spools and in contact with the sleeve and a spring urged notched roller engaging the ribbon and pressing it into engagement with the sleeve with the inking roller rotating under such engagement as the ribbon moves past thereagainst, said spool mounting means including a slide member, a spindle carried by the slide member, means locking the slide member in adjusted position and spring means for said spindle which is retractable against the urgement of the spring means and an axially located spindle in spaced complementary relation to said first spindle, the spindles journaling a spool, and means associated with the last spindle for rotating the spool, such means including a normally disengaged clutch means, and friction brake means associated with said last spindle to keep the ribbon taut as it is unwound from the spool or wound thereon.

4. A ribbon inking machine comprising an inking roller having an inner ink supply, an absorbent sleeve circumposed on the roller, means controlling the flow of ink from the roller to the sleeve, means mounting a pair of ribbon spools, means associated with such mounting means for selectively rotating the spools, guide means for the ribbon for guiding it between the spools and in contact with the sleeve and a spring urged notched roller engaging the ribbon and pressing it into engagement with the sleeve with the inking roller rotating under such engagement as the ribbon moves past thereagainst, and means mounting said inking roller for axial adjustment.

5. A ribbon inking machine comprising an inking roller having an inner ink supply, an absorbent sleeve circumposed on the roller, means controlling the flow of ink from the roller to the sleeve, means mounting a pair of ribbon spools, means associated with such mounting means for selectively rotating the spools, guide means for the ribbon for guiding it between the spools and in contact with the sleeve and a spring urged notched roller engaging the ribbon and pressing it into engagement with the sleeve with the inking roller rotating under such engagement as the ribbon moves past thereagainst, and means for holding a felt roll and moving it into peripheral contact with the inking roller.

References Cited in the file of this patent

UNITED STATES PATENTS

| Number | Name | Date |
|---|---|---|
| 341,630 | Bailey | May 11, 1886 |
| 637,565 | Hett | Nov. 21, 1899 |
| 854,674 | Spicer | May 21, 1907 |
| 977,661 | Lennox | Dec. 6, 1910 |
| 1,113,872 | Block | Oct. 13, 1914 |
| 1,115,341 | Schutz | Oct. 27, 1914 |
| 1,207,263 | Archbald | Dec. 5, 1916 |
| 1,351,582 | Mutschler | Aug. 31, 1920 |
| 2,005,503 | Pelton | June 18, 1935 |
| 2,500,569 | Rathke | Mar. 14, 1950 |
| 2,510,313 | Houth et al. | June 6, 1950 |